(12) United States Patent
Weinstein

(10) Patent No.: US 12,141,612 B2
(45) Date of Patent: Nov. 12, 2024

(54) RESOURCE ENHANCEMENT PROCESS AS A FUNCTION OF RESOURCE VARIABILITY BASED ON A RESOURCE ENHANCEMENT METRIC

(71) Applicant: Poplar Technologies, Inc., Atlanta, GA (US)

(72) Inventor: Lior Weinstein, Atlanta, GA (US)

(73) Assignee: POPLAR TECHNOLOGIES INC., Atlanta, GA (US)

( * ) Notice: Subject to any disclaimer, the term of this patent is extended or adjusted under 35 U.S.C. 154(b) by 0 days.

(21) Appl. No.: 17/975,793

(22) Filed: Oct. 28, 2022

(65) Prior Publication Data
US 2023/0236892 A1 Jul. 27, 2023

Related U.S. Application Data

(60) Provisional application No. 63/302,594, filed on Jan. 25, 2022.

(51) Int. Cl.
| | |
|---|---|
| *G06F 9/50* | (2006.01) |
| *G06F 9/451* | (2018.01) |
| *G06F 9/54* | (2006.01) |
| *G06N 3/09* | (2023.01) |
| *G06N 20/20* | (2019.01) |
| *G06Q 20/36* | (2012.01) |
| *G06Q 20/38* | (2012.01) |
| *G06Q 20/40* | (2012.01) |
| *G06Q 40/04* | (2012.01) |
| *G06Q 40/06* | (2012.01) |
| *G06N 3/088* | (2023.01) |

(52) U.S. Cl.
CPC ............ *G06F 9/5027* (2013.01); *G06F 9/451* (2018.02); *G06F 9/5033* (2013.01); *G06F 9/542* (2013.01); *G06N 3/09* (2023.01); *G06N 20/20* (2019.01); *G06Q 20/3678* (2013.01); *G06Q 20/389* (2013.01); *G06Q 20/4016* (2013.01); *G06Q 40/04* (2013.01); *G06Q 40/06* (2013.01); *G06N 3/088* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,874,477 | B2 * | 10/2014 | Hoffberg | ............ G06Q 20/065 705/37 |
| 9,152,997 | B2 | 10/2015 | Sellers, Jr. | |
| 10,453,142 | B2 * | 10/2019 | Mun | ............ G06Q 40/08 |

(Continued)

*Primary Examiner* — Abu Zar Ghaffari
(74) *Attorney, Agent, or Firm* — Caldwell Intellectual Property Law

(57) ABSTRACT

In an aspect, an apparatus for resource enhancement is presented. An apparatus includes at least a processor and a memory communicatively connected to the at least a processor. A memory contains instructions configuring at least a processor to generate a host platform. A host platform is configured to receive resource data from a user. At least a processor is configured to compare resource data of a user to a resource enhancement metric. At least a processor is configured to calculate, as a function of a comparison, a resource variability. At least a processor is configured to execute, as a function of a resource variability, a resource enhancement process.

18 Claims, 6 Drawing Sheets

(56) References Cited

U.S. PATENT DOCUMENTS

| | | |
|---|---|---|
| 2001/0027430 A1 | 10/2001 | Sabourian |
| 2013/0282621 A1 | 10/2013 | Joenk |
| 2014/0173620 A1* | 6/2014 | Chai .................. G06F 9/5027 718/104 |
| 2015/0006433 A1* | 1/2015 | Phillips ................. G06Q 40/06 705/36 R |
| 2015/0120940 A1* | 4/2015 | Kim ........................ G06F 9/50 709/226 |
| 2018/0026913 A1* | 1/2018 | Balle .................... G06F 3/0653 709/226 |
| 2019/0303922 A1* | 10/2019 | Hamasni ............... H04L 63/102 |
| 2019/0303927 A1* | 10/2019 | Shao ..................... G06F 16/27 |
| 2019/0340586 A1* | 11/2019 | Sheng .................. G06Q 20/367 |
| 2020/0019841 A1* | 1/2020 | Shaabana ............... G06F 9/505 |
| 2020/0042920 A1* | 2/2020 | Moorthy .......... G06Q 10/06312 |
| 2020/0184555 A1* | 6/2020 | Gleizer ................. H04L 9/3247 |
| 2020/0242509 A1* | 7/2020 | Clow, II ............... G06F 16/214 |
| 2020/0250606 A1* | 8/2020 | Moorthy .......... G06Q 10/06312 |
| 2020/0311573 A1* | 10/2020 | Desai ....................... G06N 3/08 |
| 2020/0409758 A1* | 12/2020 | Calmon ................ G06F 9/5061 |
| 2021/0027379 A1* | 1/2021 | Zhu ......................... G06N 3/08 |
| 2021/0049685 A1* | 2/2021 | Tachau .................. G06Q 40/03 |
| 2021/0366043 A1* | 11/2021 | Choi ..................... G06Q 20/381 |
| 2022/0019638 A1* | 1/2022 | Stephenson ......... G06F 16/9535 |
| 2022/0114664 A1* | 4/2022 | Curtis .................... G06Q 40/04 |
| 2022/0188917 A1* | 6/2022 | Petersen ............. G06Q 20/065 |
| 2022/0318903 A1* | 10/2022 | Baid .................. G06Q 30/0202 |
| 2022/0366494 A1* | 11/2022 | Cella ........................ H04L 9/50 |
| 2022/0414621 A1* | 12/2022 | Parlotto .................. G06F 21/64 |

* cited by examiner

RESOURCE ENHANCEMENT PROCESS AS A FUNCTION OF RESOURCE VARIABILITY BASED ON A RESOURCE ENHANCEMENT METRIC

CROSS-REFERENCE TO RELATED APPLICATIONS

This application claims the benefit of priority of U.S. Provisional Patent Application Ser. No. 63/302,594, filed on Jan. 25, 2022, and titled "PLATFORM FOR TEMPORARY AND INTERMITTENT TRANSFERS", which is incorporated by reference herein in its entirety.

FIELD OF THE INVENTION

The present invention generally relates to the field of resources. In particular, the present invention is directed to an apparatus and method for resource enhancement.

BACKGROUND

Understanding how to invest resources in a way that is safe and profitable is a daunting task. Investments typically require long-term commitments in order for the investment to mature into any significant value. During this time, which can be over many years, the invested resources are untouchable to the account holder.

SUMMARY OF THE DISCLOSURE

In an aspect, an apparatus for resource enhancement is presented. An apparatus includes at least a processor and a memory communicatively connected to the at least a processor. A memory contains instructions configuring at least a processor to generate a host platform. A host platform is configured to receive resource data from a user. At least a processor is configured to compare resource data of a user to a resource enhancement metric. At least a processor is configured to calculate, as a function of a comparison, a resource variability. At least a processor is configured to execute, as a function of a resource variability, a resource enhancement process.

In another aspect, a method of resource enhancement is presented. A method includes generating a host platform configured to receive resource data from a user. A method includes comparing resource data from a host platform to a resource enhancement metric. A method includes calculating, as a function of a comparison, a resource variability. A method includes executing, as a function of a resource variability, a resource enhancement process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for enhancing resources. In an embodiment, an apparatus for resource enhancement may be configured to generate a resource enhancement process based on resource variability.

Aspects of the present disclosure can be used to enhanced unused resources of one or more user accounts. Aspects of the present disclosure can also be used to transfer resources and digital assets among one or more users. This is so, at least in part, because an apparatus for resource enhancement may communicate with an application programming interface (API).

Aspects of the present disclosure allow for enhancing value of unused resources. Exemplary embodiments illustrating aspects of the present disclosure are described below in the context of several specific examples.

Figure 1:
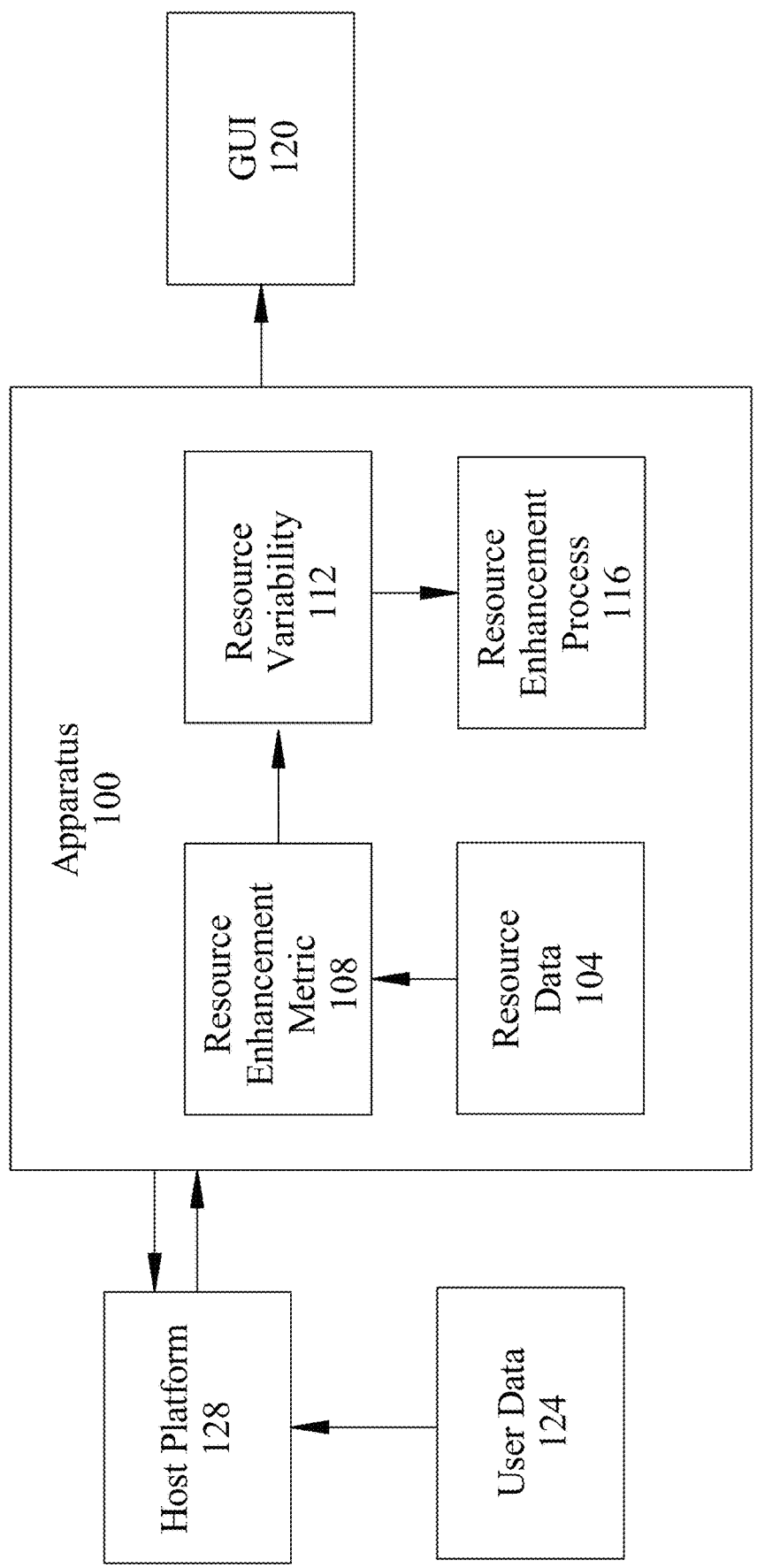
FIG. 1 is a block diagram of an exemplary embodiment of an apparatus for resource enhancement.

Referring now to FIG. 1, an exemplary embodiment of an apparatus 100 for resource enhancement is illustrated. In some embodiments, apparatus 100 may include at least a processor and a memory communicatively connected to the at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A memory may include instructions configuring at least a processor to perform various tasks.

Still referring to FIG. 1, in some embodiments, apparatus 100 may include a computing device. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or a computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, in some embodiments, apparatus 100 may be configured to receive resource data 104. "Resource data" as used in this disclosure is information pertaining to assets. "Assets" as used in this disclosure are objects and/or entities having a value associated therewith. Assets may include, but are not limited to, vehicles, houses, employees, clothing, art pieces, and the like. In some embodiments, resource data 104 may include data of one or more value quantifiers. A "value quantifier" as used in this disclosure is an object corresponding to a metric of quantity. A value quantifier may include, but is not limited to, fiat currencies, cryptocurrencies, and the like. Resource data 104 may include, without limitation, currency amounts, currency transfers, income, bills, and the like.

Still referring to FIG. 1, in some embodiments, apparatus 100 may be configured to generate and/or communicate with host platform 128. A "host platform" as used in this disclosure is a network-based portal enabling one or more users to interact among one another. Host platform 128 may include, but is not limited to, a web portal, cloud platform, mobile application, distributed database, and/or other forms of host platforms. In some embodiments, host platform 128 may be downloadable from an application marketplace to a mobile phone, tablet, laptop, smart-wearable, personal computer, server, and the like. An application of host platform 128 may include a front-end client. A "front-end client" as used in this disclosure is one or more processes that interact with a user. Front-end clients may include, without limitation, one or more graphical user interfaces (GUI). A "graphical user interface" as used in this disclosure is an interface including a set of one or more pictorial and/or graphical icons corresponding to one or more computer actions. A GUI may be configured to receive user input, as described above. A GUI may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touch-screen input, keystrokes, and the like. For instance and without limitation, an event handler may be programmed to generate a pop-up window if a user double clicks on a specific icon. User input may include, a manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with a GUI.

Still referring to FIG. 1, in some embodiments, host platform 128 may include one or more back-end clients. A "back-end client" as used in this disclosure, is one or more processes that interact with data storage and/or data retrieval. A back-end client of host platform 128 may include, without limitation, one or more process that handle queries, user input, and the like. A back-end client of host platform 128 may communicate with one or more user databases, financial accounts, and the like. A "user database" as used in this disclosure is a collection of information of an individual. A "financial database" as used in this discourse is a collection of stored user data relating to currency. A financial database may include, without limitation, mobile applications, banking accounts, crypto wallets, and the like. In some embodiments, a back-end client of host platform 128 may communicate with a front-end client of host platform 128 through an application programming interface (API). An "application programming interface" as used in this disclosure is software that enables two or more computers to communicate data to one another. An API may receive data from a front-end client of host platform 128 and communicate the data to a back-end client of host platform 128, and vice versa.

Still referring to FIG. 1, in some embodiments, apparatus 100 may receive user data 124, such as through host platform 128, user input, and/or an external computing device, without limitation. "User data" as used in this disclosure is information pertaining to an individual. User data 124 may include information such as, but not limited to, employment information, hobby information, health information, and the like. User data 124 may include, without limitation, authentication credentials, user profiles, and the like. User profiles may include, without limitation, geographical data, demographic data, employment data, family data, and the like. Apparatus 100 may generate one or more user profiles as a function of user data 124. User data 124 may include data of an organization, such as, but not limited to, excess funds, payroll accounts, pension accounts, and the like. In some embodiments, resource data 104 may be generated through apparatus 100. Apparatus 100 may generate resource data 104 through tracking and/or comparing user data 124 over a period of time, such as, without limitation, minutes, hours, days, weeks, months, years, and the like. In other embodiments, resource data 104 may be received from an external computing device, such as, without limitation, a server, desktop, laptop, cloud-computing network, and the like. User data 124 may be received through a financial database.

Still referring to FIG. 1, in some embodiments, apparatus 100 may extract resource data 104 from user data 124. Extraction may include filtering and/or querying through user data 124 for one or more keywords, phrases, symbols, and the like. Apparatus 100 may be configured to perform optical character recognition. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIG. 6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, apparatus 100 may extract resource data 104 from user data 124 through a language processing module. A language processing module may include any hardware and/or software module. A language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as Journal Storage (JSTOR) as provided by Ithaka Harbors, Inc. of New York.

Still referring to FIG. 1, in some embodiments, apparatus 100 may classify resource data 104 to one or more resource categories, such as, but not limited to, unused assets, used assets, asset increasers, asset decreases, and the like. "Unused assets" as used in this disclosure are objects and/or items of value having a static behavior. A "static behavior" as used in this disclosure is an unchanging conduct of objects and/or items. As a non-limiting example, a static behavior may include a quantity of one or more value quantifiers sitting in a savings account for over 6 months. Unused assets may include, without limitation, quantities of value quantifiers, real estate space, vehicles, and the like. "Used assets" as used in this disclosure are objects and/or items being utilized by an individual and/or company. Used assets may include, without limitation, value quantifiers, real estate space, vehicles, employees, and the like. An "asset increaser" as used in this disclosure is an object and/or item that adds value to one or more resources. Asset increasers may include, without limitation, investments, income, transactions, and the like. An "asset decreaser" as used in this disclosure is an object and/or item that removes value of one or more resources. Asset decreasers may include, without limitation, real estate spaces, vehicles, value quantifiers, transactions, and the like. Apparatus 100 may utilize a resource classifier to classify resource data 104 to one or more resource categories. A "resource classifier" as used in this disclosure is a machine learning model that categorizes resources to one or more groups A resource classifier may be trained with training data correlating resource data to resource categories, such as, but not limited to, used assets, unused asset, asset increasers, asset decreasers, and/or other resource categories. Training data may be received through user input, external computing devices, and/or previous iterations of processing.

Still referring to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 100 and/or another device may generate a classifier using a classification algorithm, defined as a processes whereby apparatus 100 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, apparatus 100 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 100 may then calculate a likelihood table by calculating probabilities of different data entries and classification labels. Apparatus 100 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, apparatus 100 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$, is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, apparatus 100 may determine and/or receive resource enhancement metric 108. A "resource enhancement metric" as used in this disclosure is a value and/or range of values indicative of asset performance. "Asset performance" as used in this disclosure is an increase or decrease of value of one or more assets. Resource enhancement metric 108 may include, without limitation, quantities of value quantifiers, balances of resources, increases in value of resources, decreases of values of resources, and the like. Resource enhancement metric 108 may include a temporal element. A "temporal element" as used in this disclosure is a metric of time. A temporal element may include, without limitation, seconds, minutes, hours, days, weeks, months, years, and the like. As a non-limiting example, resource enhancement metric 108 may include an increase in cryptocurrency assets by 10% with a temporal element of 2 years. In some embodiments, apparatus 100 may determine resource enhancement metric 108 through a resource enhancement machine learning model. A resource enhancement machine learning model may be trained with training data correlating resource data to resource enhancement metrics 108. Training data may be received through user input, external computing devices, and/or previous iterations of processing. A resource enhancement machine learning model may be configured to input resource data and output one or more resource enhancement metrics 108. In some embodiments, apparatus 100 may determine resource enhancement metric 108 as a function of user data 124. Apparatus 100 may be configured to determine a user pattern of user data 124. A "user pattern" as used in this disclosure is a relationship between user data and one or more user categories. A user pattern may include, without limitation, trends of one or more currency distributions, average quantities of currency distributions, frequencies of currency distribution types, and the like. In some embodiments, apparatus 100 may utilize a user pattern machine learning model. A user pattern machine learning model may be trained with training data correlating user data to one or more user patterns. Training data may be received through user input, external computing devices, and/or previous iterations of processing. In some embodiments, a user pattern machine learning model may be configured to input user data 124 and output user patterns. Apparatus 100 may determine resource enhancement metric 108 as a function a user pattern. For instance and without limitation, a user a pattern may show a frequent income of a quantity of 500,000 value quantifiers every month. Apparatus 100 may determine resource enhancement metric 108 to include a quantity of 500,000 value quantifiers with a temporal element of one month.

Still referring to FIG. 1, in some embodiments, apparatus 100 may compare resource data 104 to resource enhancement metric 108. Apparatus 100 may compute a score associated with resource data 104 and select resource enhancement metrics 108 to minimize and/or maximize the score, depending on whether an optimal result is represented, respectively, by a minimal and/or maximal score; a mathematical function, described herein as an "objective function," may be used by apparatus 100 to score each possible pairing. Objective function may be based on one or more objectives as described below. In various embodiments a score of a particular resource datum of resource data 104 may be based on a combination of one or more factors, including value quantifiers, quantities of assets, and the like. Each factor may be assigned a score based on predetermined variables. In some embodiments, the assigned scores may be weighted or unweighted.

Still referring to FIG. 1, optimization of an objective function may include performing a greedy algorithm process. A "greedy algorithm" is defined as an algorithm that selects locally optimal choices, which may or may not generate a globally optimal solution. For instance, apparatus 100 may select resource enhancement metrics 108 so that scores associated therewith are the best score for each resource data 104. An objective function may be formulated as a linear objective function, which apparatus 100 may solve using a linear program such as without limitation a mixed-integer program. A "linear program," as used in this disclosure, is a program that optimizes a linear objective function, given at least a constraint. For instance, a constraint may include a value and/or range of values of percent increases in resource values. In various embodiments, apparatus 100 may determine resource enhancement metric 108 that maximizes a total score subject to a constraint that unused assets are utilized above a threshold value, such as 40%. A mathematical solver may be implemented to solve for the set resource enhancement metrics 108 that maximizes scores; mathematical solver may be implemented on apparatus 100 and/or another device, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, apparatus 100 may assign variables relating to a set of parameters, which may correspond to score components as described above, calculate an output of mathematical expression using the variables, and select a resource enhancement metric 108 that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 1, in some embodiments, apparatus 100 may determine a portion of assets that may be unused as a function of a comparison of resource data 104 to resource enhancement metric 108. Apparatus 100 may search through financial accounts, databases, and the like to generate resource data 104 and determine, as a function of a comparison to resource enhancement metric 108, a quantity of unused and/or excess assets. In some embodiments, apparatus 100 may compare resource data 104 with resource enhancement metric 108 to determine resource variability 112. A "resource variability" as used in this disclosure is a change in value of one or more assets. Resource variability 112 may include, but is not limited to, percent increases in value, percent decreases in value, utilization percentage, market values, and the like. As a non-limiting example, resource variability 112 may include an increase in FIAT currency value of one or more assets by 15% over a span of 3 months. In some embodiments, resource variability 112 may include a temporal element. For instance, and without limitation, a temporal element may include days, weeks, months, years, and the like. Resource variability 112 may include a risk element of one or more resources of a user's account. A "risk element" as used in this disclosure is a metric pertaining to a loss probability of assets. Resource variability 112 may include risk elements such as, but not limited to, high-risk, low-risk, medium-risk, and the like. In some embodiments, resource variability 112 may include a probability of missing a financial inquiry when moving one or more resources. A "financial inquiry" as used in this disclosure is a request for one or more value quantifiers from an entity. Financial inquires may include, without limitation, bills, pending payments, and the like. Apparatus 100 may calculate resource variability 112 to include a probability of defaulting on one or more financial inquiries of a user. For instance, and without limitation, resource variability 112 may include a 30% probability of defaulting on a $300 payment if $400 worth of assets of a user's account are removed from their savings account and are invested into the New York Stock Exchange (NYSE).

Still referring to FIG. 1, in some embodiments, apparatus 100 may utilize a resource variability machine learning model. A resource variability machine learning model may be trained with training data correlating resource data and/or resource enhancement metrics to resource variabilities. Training data may be received through user input, external computing devices, and/or previous iterations of processing. A resource variability machine learning model may be configured to input resource data and/or resource enhancement metrics and output one or more resource variabilities 112. Apparatus 100 may use a resource variability machine learning model to predict portions of a user's financial account that may be utilized, such as, without limitation, checking accounts, savings accounts, and the like. Apparatus 100 may use a resource variability machine learning model to predict loss probabilities of one or more resource categories, such as, but not limited to, used assets, unused asset, asset increasers, asset decreases, and the like. For instance and without limitation, apparatus 100 may predict a loss probability of 3% for $10,000 moved from a user's savings account to an investment account based on a user's upcoming expenses.

Still referring to FIG. 1, in some embodiments, apparatus 100 may be configured to generate resource enhancement process 116 as a function of resource data 104, resource enhancement metric 108, and/or resource variability 112, without limitation. A "resource enhancement process" as used in this disclosure is one or more steps of increasing value of one or more assets. Resource enhancement process 116 may be generated by a resource enhancement process machine learning model. A resource enhancement process machine learning model may be trained with training data correlating resource data, resource enhance met metrics, and/or resource variabilities with resource enhancement process. Training data may be received through user input, external computing devices, and/or previous iterations of processing. In some embodiments, apparatus 100 may use a resource enhancement process machine learning model to determine resource enhancement process 116. Resource enhancement process 116 may include, but is not limited to, transferring funds between financial accounts, investing a portion of a user's assets into the NYSE, and the like.

Still referring to FIG. 1, in some embodiments, apparatus 100 may determine unused assets from resource data 104 and generate resource enhancement process 116 to increase value of one or more assets of resource data 104. Apparatus 100 may determine a temporal element of one or more financial inquires, such as, but not limited to, days, weeks, months, years, and the like. Resource enhancement process 116 may include a cushion element. A "cushion element" as used in this disclosure is a time period before a financial inquiry needs to be fulfilled. For instance, and without limitation, a cushion element may include days, weeks, months, and the like. Apparatus 100 may determine upcoming financial inquires based on user patterns, as described above. In some embodiments, apparatus 100 may calculate resource variability 112 based on one or more financial inquiries and/or cushion elements. For instance, and without limitation, a financial inquiry three days away may increase a loss probability of utilizing one or more assets of a user's account, whereas a financial inquiry three months away may lower a loss probability of utilizing one or more assets of a user's account. Apparatus 100 may generate resource enhancement process 116 to include one or more transfers of assets to account for upcoming financial inquires. Resource enhancement process 116 may include a temporary withdrawal and investment of one or more assets of a user's account. As a non-limiting example, apparatus 100 may determine user data 124 such as, but not limited to, account balance history information, transactional history, debits, credits, and the like, and predict a quantity of assets that may be safely available to invest for a few days, weeks, and the like. Resource enhancement process 116 may include a process of converting FIAT currency of a user's accounts to cryptocurrency and invest the cryptocurrency. In some embodiments, apparatus 100 may communicate with an investment partner, which may include the investment partner staking an investment to a smart contract. Apparatus 100 may determine a risk element of a smart contract, such as, but not limited to, erroneous code, unstable crypto wallets, anomalous wallet behavior, and the like. Apparatus 100 may withdraw assets from a crypto wallet and/or smart contract as a function of a risk element of a smart contract.

Still referring to FIG. 1, in some embodiments, host platform 128 may be configured to perform a temporary transfer and/or return of resources of a user's account. A "temporary transfer" as used in this disclosure is an allocation of assets that returns to an initial account within a time period. In some embodiments, host platform 128 may receive user data 124 in a form of, but not limited to, a bank account identifier (e.g., account number, bank ID, etc.) of an account that the user would like to temporarily invest from. Host platform 128 may receive an account identifier and identify a corresponding financial institution that issued the account number. Host platform 128 may access transaction history, account balance history, and the like of a bank account from a financial institution, for example, and without limitation, via one or more API calls to an API of the financial institution. An API call may include an identifier of the bank account of a user. A financial institution may provide transaction history from a bank account over a predetermined historical period of time (e.g., 2 years, 5 years, etc.) and transmit account history information to host platform 128 in response to an API call.

Still referring to FIG. 1, apparatus 100 may process and/or analyze account history information of resource data 104, which may be extracted from user data 124 through host platform 128. Apparatus 100 may generate resource enhancement process 116 to provide a user with a recommended investment amount and time window. In some embodiments, a user may include an organization with a payroll account. As a non-limiting example, an organization may include a payroll account where money sits and earns 0.2% interest. In this example, apparatus 100 may utilize one or more machine learning models to analyze the transaction history of the organization and provide a "safe" investment amount as well as a period of time in which the amount can be invested. A safe investment amount may include a predetermined amount of FIAT currency, along with a cushion (e.g., a few thousand dollars, etc.) that may provide an additional amount of protection in the account in the case that one or more unexpected expenses occur. A cushion may be kept in a bank account rather than being invested. For example, and without limitation, an organization may have $1,000,000 dollars in their payroll account. One or more machine learning models may analyze the transaction history of the user including account balance history, expenses, timing information, etc., and identify a pattern of spending behavior and also a pattern of the account balance. One or more machine learning models may learn that a payroll account also is used for making payments on supplies every 3 months that can be of a significant expense (e.g., $75,000). One or more machine learning models may also learn that the payment for supplies is to occur in 1 week. One or more machine learning models may determine that $925,000 of an account balance is safe to invest. In some embodiments, to incorporate a cushion, a machine learning models may add in a buffer to prevent an account from being overdrawn. For example, and without limitation, a buffer and/or cushion may include an amount of $25,000. Continuing this example, one or more machine learning models 222 may recommend a total investment amount of $900,000 based on a buffer amount of $25,000.

Still referring to FIG. 1, as another non-limiting example, apparatus 100 may learn that a payroll account has a significant amount of historical fluctuation during a following month, for example, because of bonuses being paid out to employees, etc. In this case, apparatus 100 and/or one or more machine learning models may recommend that a time window expire before a following month, which happens to be 3 weeks away. Continuing this example, one or more machine learning models may output a recommendation of investing $900,000 for a total of 18 days. This time period may be determined by the one or more machine learning models based on subtracting a period of time necessary to return the money to the account (e.g., 2 days, etc.). This information can be sent by host platform 128 to a front-end of the application on a user device. A "user device" as used in this disclosure is a computing device operated by an individual. A user device may include, without limitation, a smartphone, laptop, tablet, desktop, server, and the like.

Referring still to FIG. 1, in some embodiments, apparatus 100 and/or host platform 128 may perform a process of transferring funds from a bank account of a user to a crypto-investor. A "crypto-investor" as used in this disclosure is a financial entity operating in cryptocurrency. In some embodiments, apparatus 100 may process a transfer of funds for the purpose of a short-term investment. As a non-limiting example, host platform 128 and/or apparatus 100 may act as an agent for a user and receive an authorization from a user device to invest a predetermined amount of money for a predetermined amount of time, such as the $900,000 for 18 days, in the example given above. Host platform 128 may also receive "authorization" from a user device to automatically pull money out of the payroll account, and return the money to the payroll account within the 18 day period, or less. In response, host platform 128 may transfer funds from the payroll account hosted by a financial institution to a crypto-investor. A crypto-investor may convert funds, such as FIAT currency, into cryptocurrency (e.g., Bitcoin, etc.) and then invest the cryptocurrency in any number of blockchain-based networks, such as stablecoin networks which may allow staking to smart contracts. In some embodiments, in response to receiving fiat currency from host platform 128, a crypto-investor may convert the fiat currency into cryptocurrency and store the cryptocurrency in a temporary blockchain wallet. A crypto-investor may give both a user of a user device and host platform 128 access to a blockchain wallet. For example, and without limitation, both a user device and host platform 128 may be given respective keys for accessing a blockchain wallet.

Referring still to FIG. 1, as another non-limiting example, a crypto-investor may have a predetermined investment strategy (e.g., submitted by a user, etc.) that may be specified ahead of time. A crypto-investor may temporarily invest cryptocurrency in a blockchain wallet in a blockchain network until a predetermined period has expired (e.g., the 18 days are up), or until a predetermined amount of interest has been earned (e.g., 10%, etc.) Continuing this example, either condition may trigger a crypto-investor (e.g., based on a request from host platform 128, based on an internal trigger by a crypto-investor, etc.), to pull the money out of the blockchain network and return the money back to host platform 128. Here, a crypto-investor may transfer/sell/exchange the cryptocurrency from a blockchain wallet via a blockchain network, and convert the resulting cryptocurrency back into fiat currency. Still continuing this example, a crypto-investor may return the fiat currency back to host platform 128, which may automatically put the money (with the interest earned by the crypto-investor) to the user's account at a financial institution. As a result of the example embodiments, a traditional bank account that earns very little or no interest, can earn significantly more interest by performing intermittent and continuous short-term investments based on a combination of account history analysis and temporary crypto-investments that can yield substantially more interest than a traditional bank account. In some embodiments, one or more of host platform 128 and a crypto-investor may take a small percentage for their role in the above process.

Still referring to FIG. 1, in some embodiments, host platform 128 may also provide automated "claimless" insurance for digital currency yield aggregators. In the example embodiments, a new kind of vault (yield aggregator) is provided that provides a negative yield relative to the potential, but in favor, a user's principal funds may be insured. In other words, a yield aggregator may take a percentage of any growth/interest earned on the principal, but the yield aggregator may also cover any losses to the principal funds, should an investment go bad/poorly. As a non-limiting example, instead of earning 5%, a user may earn 85% of 5% which is equal to 4.25% of the gains instead of the whole 5%. However, if the principal goes down from $100 to $80, the user would not lose anything and the yield aggregator would lose $20.

Still referring to FIG. 1, in some embodiments, apparatus 100 may be configured to display resource enhancement process 116, resource data 104, and/or other data as described above, without limitation, through GUI 120. GUI 120 may include a graphical user interface as described above. In some embodiments, GUI 120 may include a display of a laptop, smartphone, tablet, monitor, and the like. GUI 120 may include one or more graphs, pictorial icons, and the like that may represent resource data 104, resource variability 112, resource enhancement process 116, and the like. In some embodiments, GUI 120 may be configured to receive user input. A user may interact with one or more graphical elements of GUI 120, such as, but not limited to, clicking, dragging, dropping, entry of one or more text fields, and the like. GUI 120 may be configured to display resource data 104 as a function of user input. As a non-limiting example, a user may click on a graphical element, which may trigger an event handler of the graphical element which may display additional resource data 104 through GUI 120.

Figure 2:
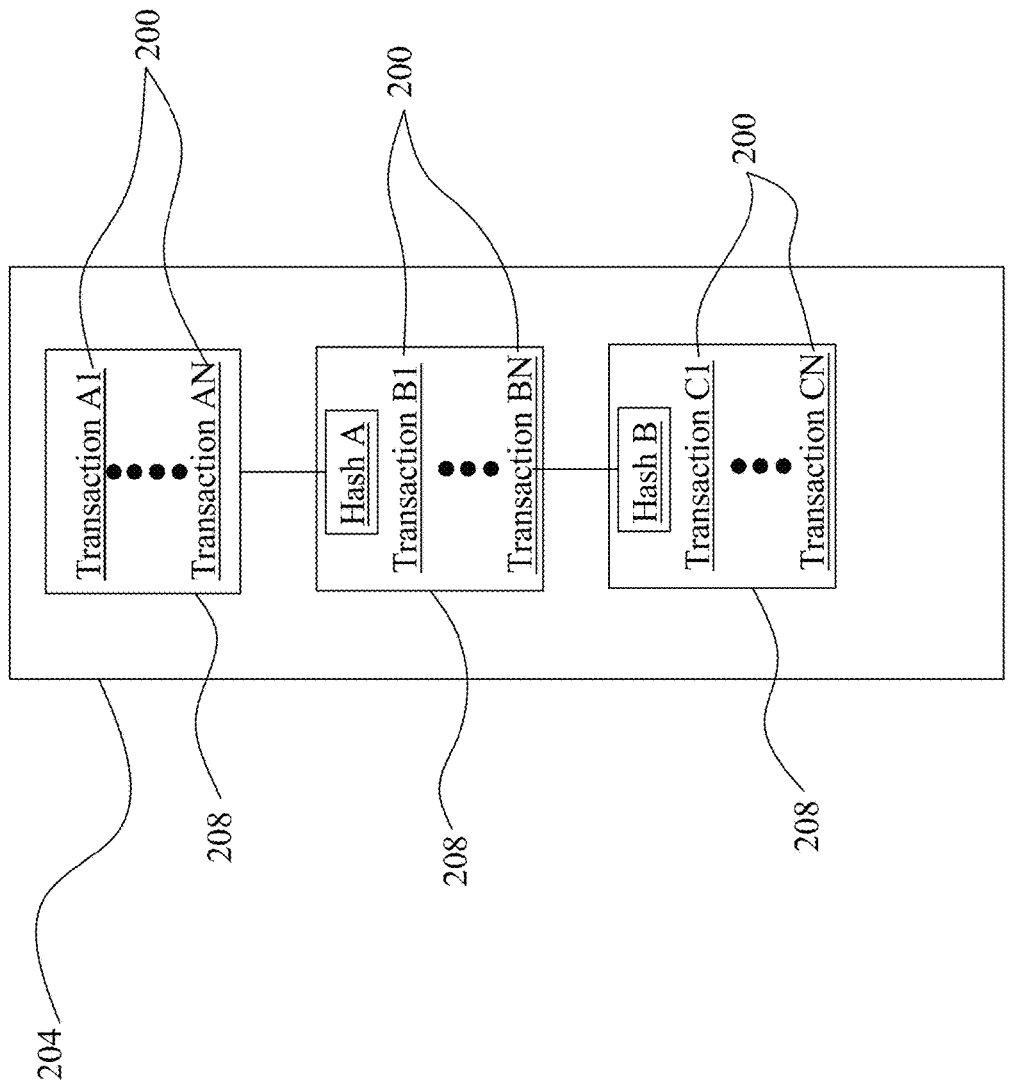
FIG. 2 is an exemplary embodiment of a fuzzy logic comparison.

Referring now to FIG. 2, an exemplary embodiment of an immutable sequential listing 200 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
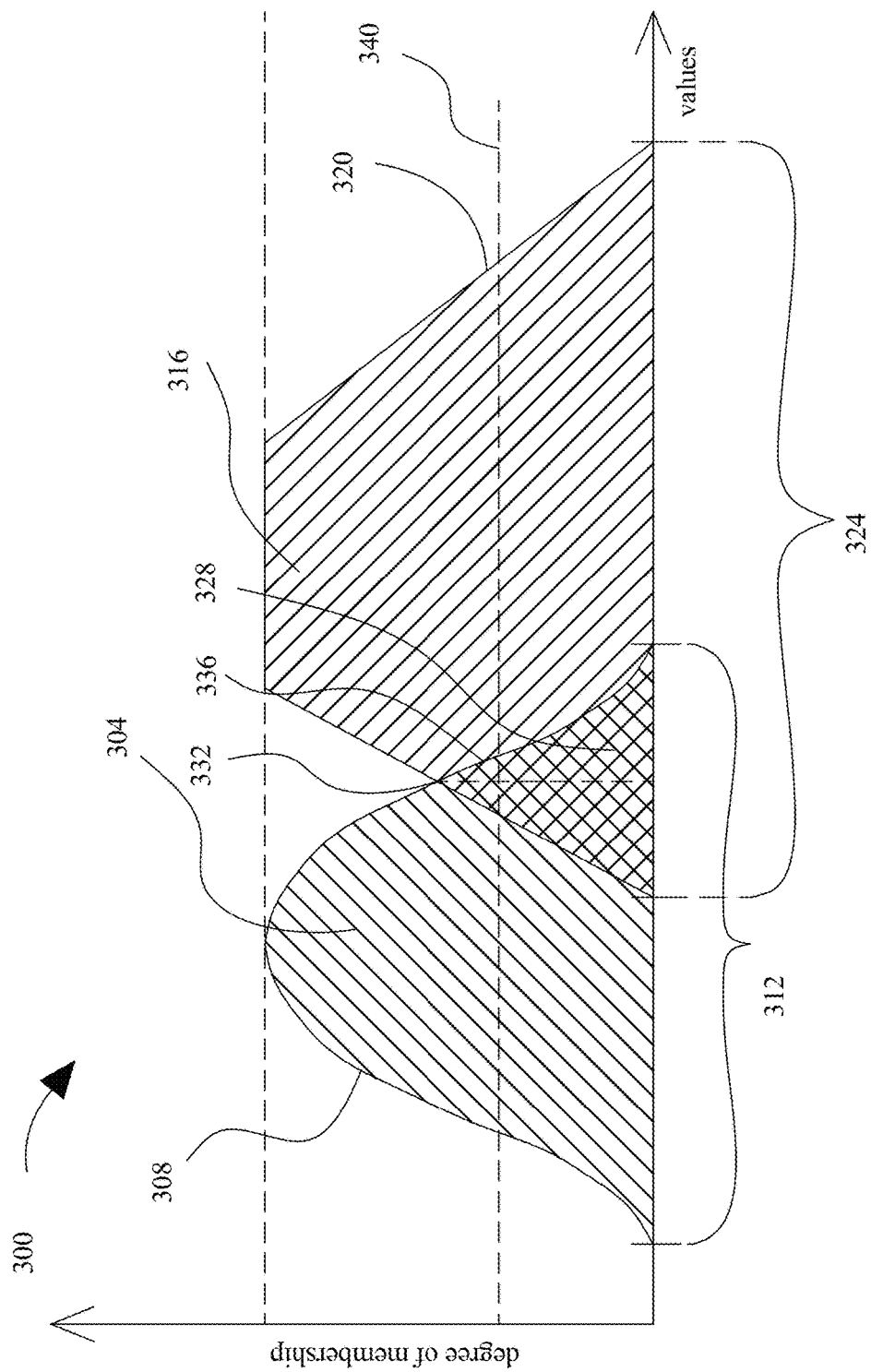
FIG. 3 is an exemplary embodiment of an immutable sequential listing.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models, resource enhancement metrics, and a predetermined class, such as without limitation of resource enhancement processes. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or resource enhancement metrics and a predetermined class, such as without limitation resource enhancement processes categorization, for combination to occur as described above. Alternatively or additionally, each threshold may be tuned by a machine-learning and/or statistical process, for instance and without limitation as described in further detail below.

Further referring to FIG. 3, in an embodiment, a degree of match between fuzzy sets may be used to classify resource enhancement metrics with resource enhancement processes. For instance, if a resource enhancement process has a fuzzy set matching a resource enhancement metric fuzzy set by having a degree of overlap exceeding a threshold, apparatus 100 may classify the resource enhancement metric as belonging to the resource enhancement process categorization. Where multiple fuzzy matches are performed, degrees of match for each respective fuzzy set may be computed and aggregated through, for instance, addition, averaging, or the like, to determine an overall degree of match.

Still referring to FIG. 3, in an embodiment, a resource enhancement metric may be compared to multiple resource enhancement process categorization fuzzy sets. For instance, resource enhancement metrics may be represented by a fuzzy set that is compared to each of the multiple resource enhancement process categorization fuzzy sets; and a degree of overlap exceeding a threshold between the resource enhancement metrics fuzzy set and any of the multiple resource enhancement processes categorization fuzzy sets may cause apparatus 100 to classify the resource enhancement metrics as belonging to the resource enhancement processes categorization. For instance, in one embodiment there may be two resource enhancement processes categorization fuzzy sets, representing respectively resource enhancement processes categorization and a resource enhancement processes categorization. First resource enhancement processes categorization may have a first fuzzy set; Second resource enhancement processes categorization may have a second fuzzy set; and resource enhancement metrics may have a resource enhancement metrics fuzzy set. Apparatus 100, for example, may compare an resource enhancement metrics fuzzy set with each of resource enhancement processes categorization fuzzy set and in a resource enhancement processes categorization fuzzy set, as described above, and classify a resource enhancement metrics to either, both, or neither of resource enhancement processes categorization or in a resource enhancement processes categorization. Machine-learning methods as described throughout may, in a non-limiting example, generate coefficients used in fuzzy set equations as described above, such as without limitation x, c, and $\sigma$ of a Gaussian set as described above, as outputs of machine-learning methods. Likewise, resource enhancement metrics may be used indirectly to determine a fuzzy set, as resource enhancement metrics fuzzy set may be derived from outputs of one or more machine-learning models that take the resource enhancement metrics directly or indirectly as inputs.

Still referring to FIG. 3, a computing device and/or apparatus 100 may use a logic comparison program, such as, but not limited to, a fuzzy logic model to determine a resource enhancement processes response. An resource enhancement processes response may include, but is not limited to, low risk, medium risk, high risk, and the like; each such resource enhancement processes response may be represented as a value for a linguistic variable representing resource enhancement processes response or in other words a fuzzy set as described above that corresponds to a degree of loss probability as calculated using any statistical, machine-learning, or other method that may occur to a person skilled in the art upon reviewing the entirety of this disclosure. In other words, a given element of resource enhancement metrics may have a first non-zero value for membership in a first linguistic variable value such as "10" and a second non-zero value for membership in a second linguistic variable value such as "5" In some embodiments, determining a resource enhancement processes categorization may include using a linear regression model. A linear regression model may include a machine learning model. A linear regression model may be configured to map data of resource enhancement metrics, such as degree of risk to one or more resource enhancement processes parameters. A linear regression model may be trained using a machine learning process. A linear regression model may map statistics such as, but not limited to, quality of resource enhancement metrics, loss probabilities of assets, and the like. In some embodiments, determining a resource enhancement process of resource enhancement metrics may include using a resource enhancement processes classification model. A resource enhancement process classification model may be configured to input collected data and cluster data to a centroid based on, but not limited to, frequency of appearance, linguistic indicators of quality, and the like. Centroids may include scores assigned to them such that quality of resource enhancement processes of resource enhancement metrics may each be assigned a score. In some embodiments resource enhancement processes classification model may include a K-means clustering model. In some embodiments, resource enhancement processes classification model may include a particle swarm optimization model. In some embodiments, determining the resource enhancement processes of a resource enhancement metrics may include using a fuzzy inference engine. A fuzzy inference engine may be configured to map one or more resource enhancement metrics data elements using fuzzy logic. In some embodiments, resource enhancement metrics may be arranged by a logic comparison program into resource enhancement processes arrangement. A "resource enhancement processes arrangement" as used in this disclosure is any grouping of objects and/or data based on loss probabilities, risk level and/or predicted increases in asset value. This step may be implemented, without limitation, as described above in FIG. 1. Membership function coefficients and/or constants as described above may be tuned according to classification and/or clustering algorithms. For instance, and without limitation, a clustering algorithm may determine a Gaussian or other distribution of resource variabilities about a centroid corresponding to a given risk level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to resource enhancement metrics, such as a degree of weighted value of a resource, while a second membership function may indicate a degree of resource enhancement processes of a subject thereof, or another measurable value pertaining to resource enhancement metrics. Continuing the example, an output linguistic variable may represent, without limitation, a score value. An inference engine may combine rules, such as: "if the resource variability is 'high' and the loss probability is 'high' the resource enhancement process is 'high risk'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 3, resource enhancement metrics to be used may be selected by user selection, and/or by selection of a distribution of output scores, such as 40% low risk, 40% moderate risk, and 20% high risk or the like. Each resource enhancement processes categorization may be selected using an additional function such as in a resource enhancement process as described above.

Figure 4:
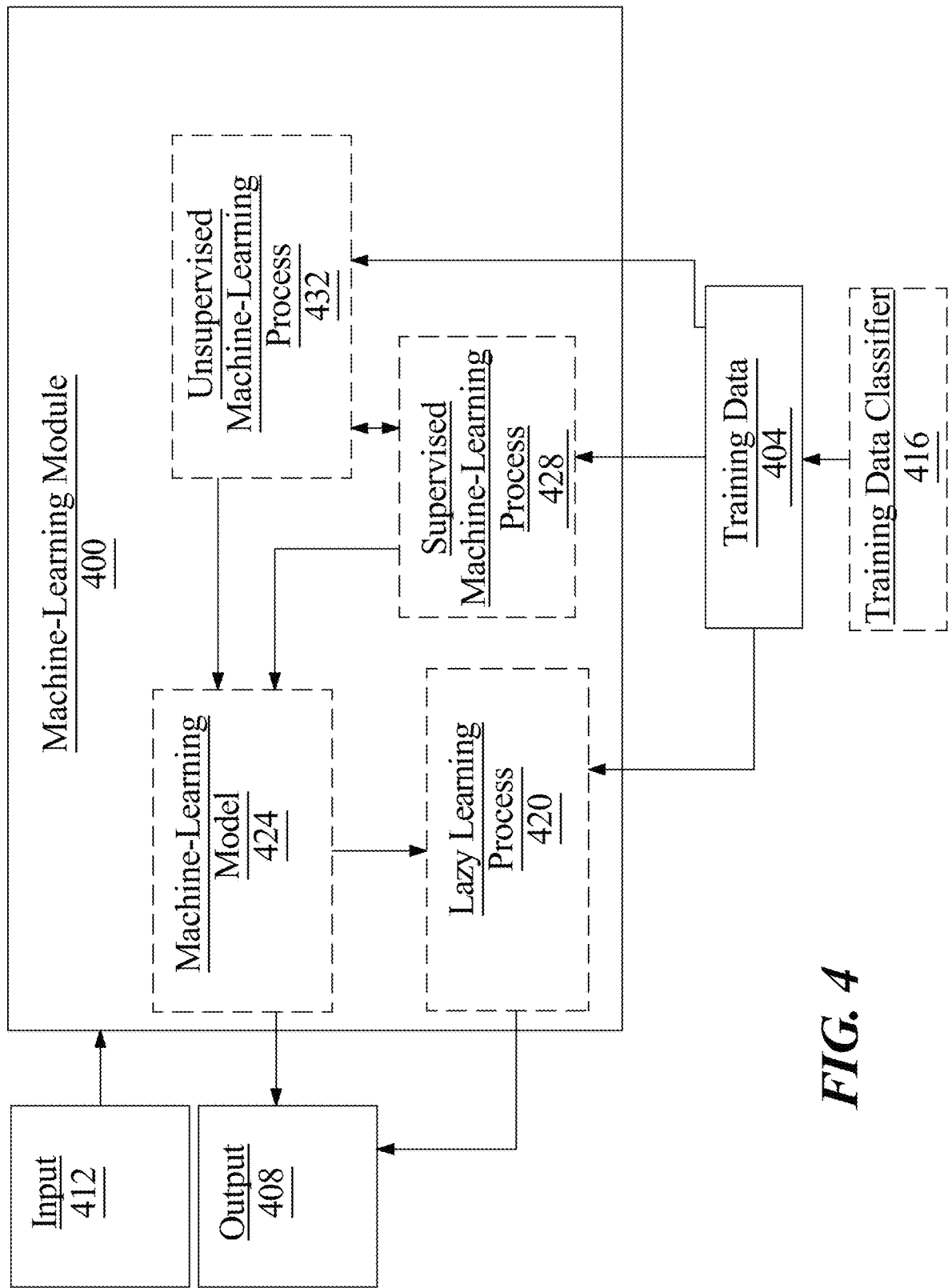
FIG. 4 is an exemplary embodiment of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include resource data and outputs may include resource enhancement processes.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to resource categories, such as, but not limited to, unused, used, asset increaser, asset decreaser, and the like.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include resource data as described above as inputs, resource processes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
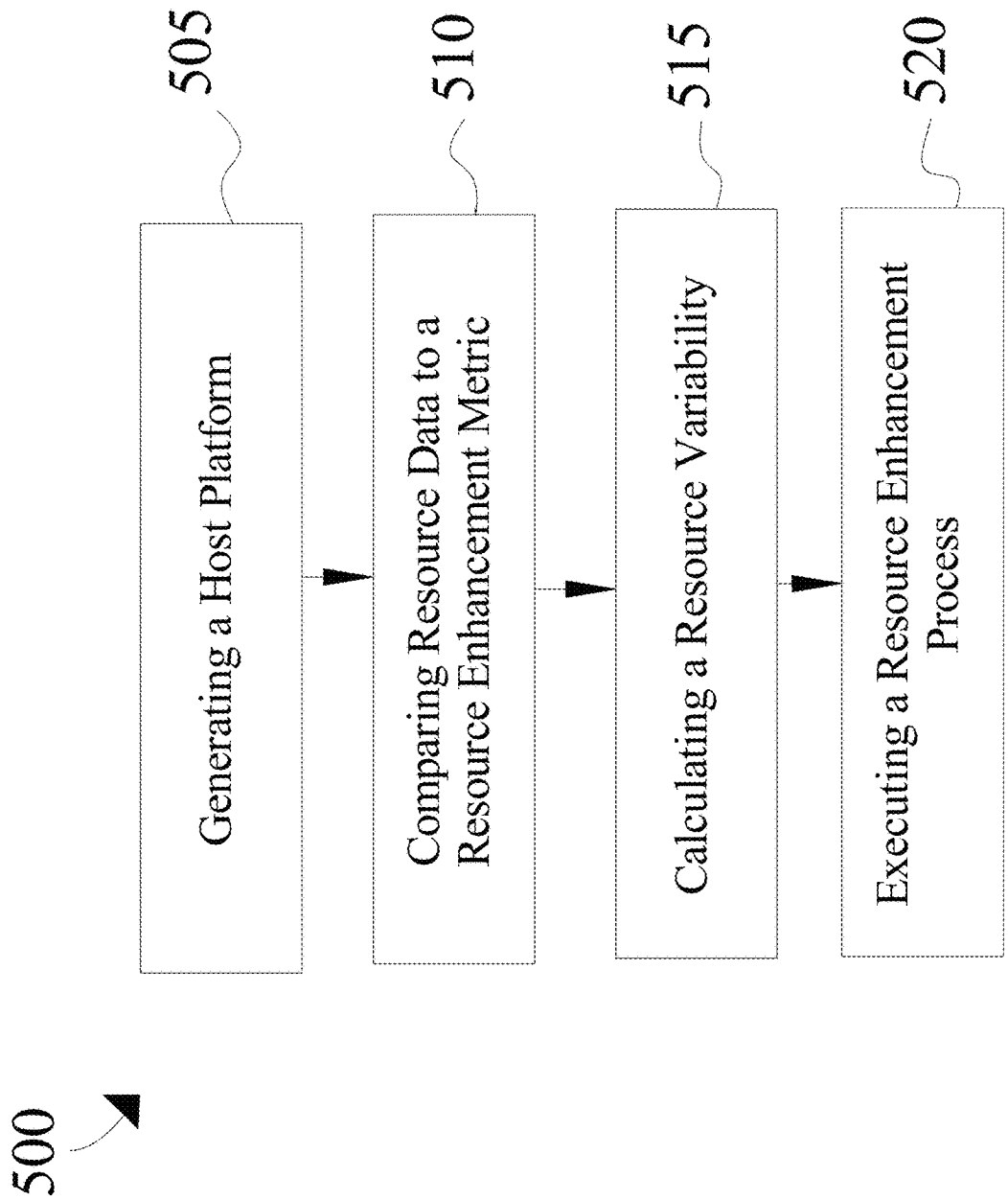
FIG. 5 is an exemplary embodiment of a method of enhancing resources.

Referring now to FIG. 5, a method 500 of resource enhancement is presented. At step 505, method 500 includes generating a host platform. A host platform may include a network, web portal, server, and the like. A host platform may include a front-end client, back-end client, and API. A host platform may include host platform 128 as described above with reference to FIG. 1. In some embodiments, a host platform may be configured to receive user data and/or resource data. This step may be implemented, without limitation, as described above in FIGS. 1-4.

Still referring to FIG. 5, at step 510, method 500 includes comparing resource data to a resource enhancement metric. Resource data may be compared to a resource enhancement metric through an optimization problem, machine learning model, and the like. This step may be implemented, without limitation, as described above in FIGS. 1-4.

Still referring to FIG. 5, at step 515, method 500 includes calculating a resource variability. A resource variability may include a predicted increase or decrease of value of one or more assets of a user's resource. In some embodiments, a resource variability may be calculated through a machine learning model. In some embodiments, calculating a resource variability may include determining a temporal element of the resource data. In some embodiments, a resource variability may include a static resource behavior. This step may be implemented, without limitation, as described above in FIGS. 1-4.

Still referring to FIG. 5, at step 520, method 500 includes executing a resource enhancement process. A resource enhancement process may be executed by a host platform, apparatus 100, and/or other computing device. A resource enhancement process may include reallocating one or more assets of a financial account to a crypto wallet. In some embodiments, a resource enhancement process may be provided to a user through a graphical user interface (GUI). This step may be implemented, without limitation, as described above in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
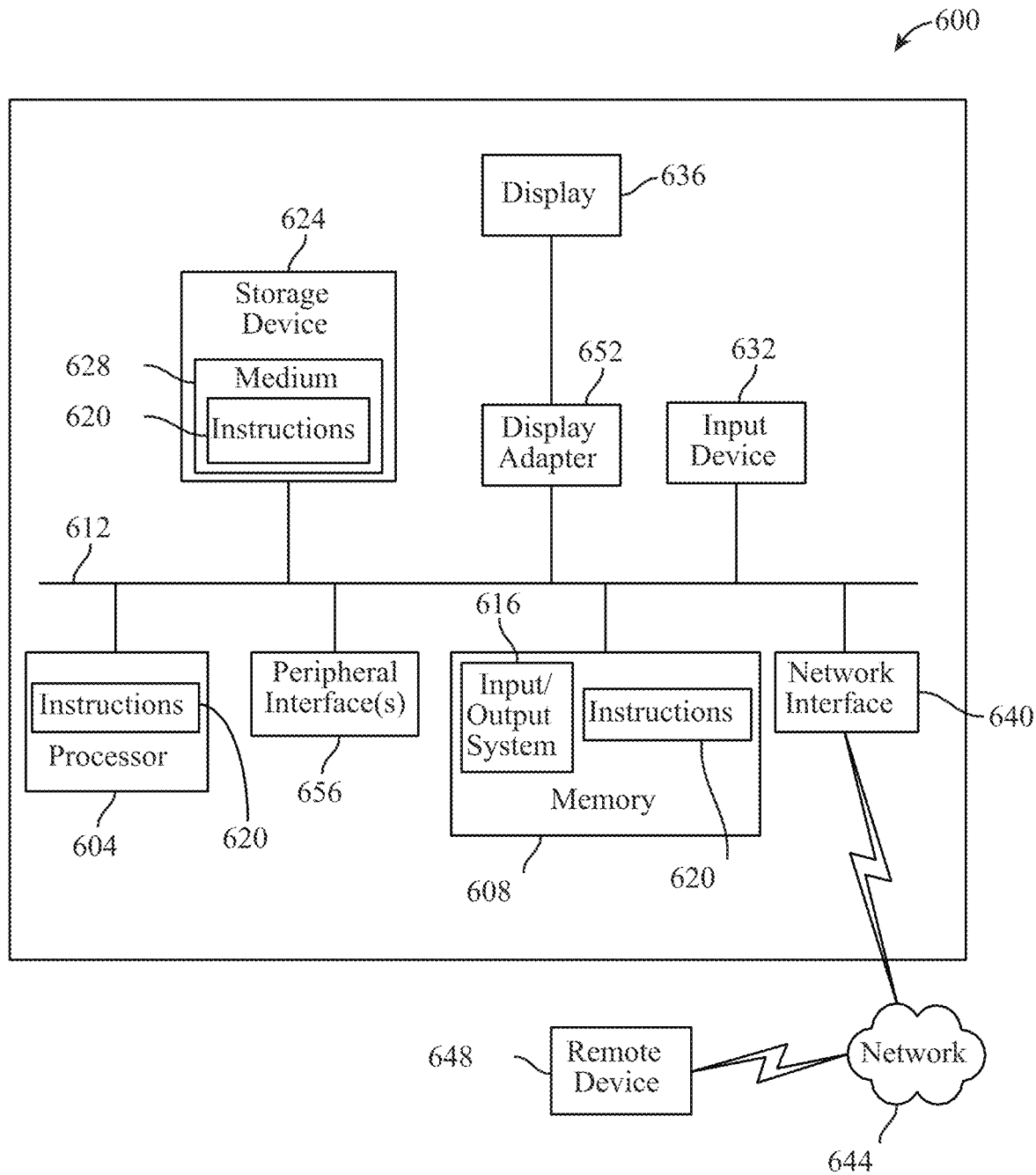
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Still referring to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for asset enhancement, comprising:
   at least a processor; and
   a memory communicatively connected to the at least a processor, the memory containing instructions configuring the at least a processor to:
      communicate, at the at least a processor, a host platform, wherein the host platform is configured to receive asset data from a user, wherein the asset data comprises information pertaining to at least an asset having a first value associated therewith;
      determine, at the at least a processor, an asset enhancement metric based on the asset data, wherein the asset enhancement metric comprises at least a second value indicative of a performance of the at least an asset;
      calculate, at the at least a processor, and as a function of the asset data and the asset enhancement metric, an asset variability of the at least an asset, the asset variability including a change of value from the first value of the at least an asset, wherein the asset variability comprises a risk element associated with the at least an asset and a probability of missing at least one financial inquiry for the user; and
      execute, at the at least a processor, and as a function of the asset variability, an asset enhancement process, wherein executing the asset enhancement process comprises:
         determining the at least one financial inquiry based on user patterns determined from the asset data;
         determining a cushion element for the at least one financial inquiry of the user;
         predicting an available quantity of the at least an asset based on the asset variability, the at least one financial inquiry, a buffer amount for the at least an asset, and the asset enhancement metric, wherein predicting the available quantity comprises:
            determining the buffer amount for the at least an asset based on the user patterns;
         performing a temporary transfer of the at least an asset based on the cushion element, the available quantity of the at least an asset, wherein performing the temporary transfer of the at least an asset comprises:
            receiving a plurality of user data, wherein the plurality of user data comprises one or more authentication credentials associated with a user account; and
            temporarily transferring at least a portion of the at least an asset from the user account to a second account as a function of the plurality of user data.

2. The apparatus of claim 1, wherein the memory contains instructions further configuring the at least a processor to classify the asset data to asset categories through an asset classifier.

3. The apparatus of claim 1, wherein the memory contains instructions further configuring the at least a processor to:
   receive training data correlating a plurality of asset variability data to a plurality of asset enhancement processes;
   train an asset enhancement process machine learning model with the training data; and
   generate the asset enhancement process as a function of the asset enhancement process machine learning model, wherein the asset enhancement process machine learning model is configured to input the asset variability data and output the asset enhancement process.

4. The apparatus of claim 1, wherein the host platform is configured to communicate with a plurality of computing devices through an application programming interface (API).

5. The apparatus of claim 1, wherein the memory contains instructions further configuring the at least a processor to determine a quantity of static assets of the asset data as a function of the asset enhancement metric.

6. The apparatus of claim 1, wherein the memory contains instructions further configuring the at least a processor to calculate the asset variability using an asset variability machine learning model, wherein the asset variability machine learning model is configured to input the asset data and output a plurality of loss probabilities of the at least an asset.

7. The apparatus of claim 1, wherein the asset enhancement process comprises storing the at least an asset on an immutable sequential listing.

8. The apparatus of claim 1, wherein the memory contains instructions further configuring the at least a processor to:
   determine a user pattern of the asset data; and
   generate the asset enhancement process as a function of the user pattern.

9. The apparatus of claim 1, wherein the memory contains instructions further configuring the at least a processor to display the asset enhancement process through a graphical user interface (GUI).

10. A method of asset enhancement using a computing device, comprising:

communicating, at a computing device, a host platform, wherein the host platform is configured to receive asset data from a user, wherein the asset data comprises information pertaining to at least an asset having a first value associated therewith;

determining, at the computing device, an asset enhancement metric based on the asset data, wherein the asset enhancement metric comprises at least a second value indicative of a performance of the at least an asset;

calculating, at the computing device, as a function of the asset data and the asset enhancement metric, an asset variability of the at least an asset, the asset variability including a change of value from the first value of the at least an asset, wherein the asset variability comprises a risk element associated with the at least an asset and a probability of missing at least one financial inquiry for the user; and executing, as a function of the asset variability and at the computing device, an asset enhancement process, wherein executing the asset enhancement process comprises:

determining the at least one financial inquiry based on user patterns determined from the asset data;

determining a cushion element for the at least one financial inquiry to be fulfilled by the at least an asset;

predicting an available quantity of the at least an asset based the asset variability, the at least one financial inquiry, a buffer amount for the at least an asset, and the asset enhancement metric, wherein predicting the available quantity comprises:

determining the buffer amount for the at least an asset based on the user patterns;

performing a temporary transfer of the at least an asset based on the cushion element and the available quantity of the at least an asset, wherein performing the temporary transfer of the at least an asset comprises:

receiving a plurality of user data from a user, wherein the plurality of user data comprises one or more authentication credentials associated with a user account; and temporarily transferring at least a portion of the at least an asset from the user account to a second account as a function of the plurality of user data.

11. The method of claim 10, further comprising classifying the asset data to resource categories through an asset classifier.

12. The method of claim 10, further comprising:

receiving training data correlating a plurality of asset variability data to a plurality of asset enhancement processes;

training an asset enhancement process machine learning model with the training data; and generating the asset enhancement process as a function of the asset enhancement process machine learning model, wherein the asset enhancement process machine learning model is configured to input the asset variability data and output the asset enhancement process.

13. The method of claim 10, wherein the host platform is configured to communicate with a plurality of computing devices through an application programming interface (API).

14. The method of claim 10, further comprising determining a quantity of static assets of the asset data as a function of the asset enhancement metric.

15. The method of claim 10, further comprising calculating the asset variability through an asset variability machine learning model, wherein the asset variability machine learning model is configured to input the asset data and output loss probabilities of the at least an asset.

16. The method of claim 10, wherein the asset enhancement process comprises storing the at least an asset on an immutable sequential listing.

17. The method of claim 10, further comprising determining a user pattern of the asset data and generate the asset enhancement process as a function of the user pattern.

18. The method of claim 10, further comprising displaying the asset enhancement process through a graphical user interface (GUI).

* * * * *